(12) United States Patent
Wyatt et al.

(10) Patent No.: US 7,952,493 B2
(45) Date of Patent: May 31, 2011

(54) SYSTEM AND METHOD FOR RENDERING A PRIMARY FLIGHT DISPLAY HAVING AN ATTITUDE FRAME ELEMENT

(75) Inventors: Ivan Sandy Wyatt, Scottsdale, AZ (US); Jary Engels, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 349 days.

(21) Appl. No.: 12/331,811

(22) Filed: Dec. 10, 2008

(65) Prior Publication Data

US 2010/0141482 A1    Jun. 10, 2010

(51) Int. Cl.
*G01C 21/00* (2006.01)
(52) U.S. Cl. ........ 340/974; 340/967; 340/971; 340/973; 340/975; 701/4
(58) Field of Classification Search .................. 340/945, 340/963, 964, 967, 971, 973, 970, 974, 975; 701/4, 14
See application file for complete search history.

(56) References Cited

U.S. PATENT DOCUMENTS

| 6,696,980 | B1 * | 2/2004 | Langner et al. | 340/971 |
| 6,985,801 | B1 * | 1/2006 | Straub et al. | 701/3 |
| 7,295,135 | B2 * | 11/2007 | Younkin | 340/971 |
| 7,307,549 | B2 * | 12/2007 | Firra | 340/974 |
| 7,626,515 | B1 * | 12/2009 | Langner et al. | 340/971 |

* cited by examiner

*Primary Examiner* — Davetta W Goins
(74) *Attorney, Agent, or Firm* — Ingrassia Fisher & Lorenz, P.C.

(57) ABSTRACT

A flight deck display element for an aircraft includes a primary flight display rendered thereon. The primary flight display includes a primary display region having a perimeter, a perspective view of terrain corresponding to a flight deck viewpoint, and an attitude frame surrounding the perimeter of the primary display region. The perspective view of terrain is rendered in the primary display region, and the attitude frame includes a first region and a second region rendered with different visually distinguishable characteristics. The boundaries of the first region and the second region are defined by a current attitude condition of the aircraft.

20 Claims, 6 Drawing Sheets

SYSTEM AND METHOD FOR RENDERING A PRIMARY FLIGHT DISPLAY HAVING AN ATTITUDE FRAME ELEMENT

TECHNICAL FIELD

Embodiments of the subject matter described herein relate generally to avionics systems such as flight display systems. More particularly, embodiments of the subject matter relate to a flight deck display system that generates a perspective view of terrain surrounded by a border or frame that conveys aircraft attitude information in a graphical and easy to interpret manner.

BACKGROUND

Modern flight deck displays for vehicles (such as aircraft or spacecraft) display a considerable amount of information, such as vehicle position, speed, altitude, attitude, navigation, target, and terrain information. In the case of an aircraft, most modern displays additionally display a flight plan from different views, either a lateral view, a vertical view, or a perspective view, which can be displayed individually or simultaneously on the same display.

The lateral view, generally known as a lateral map display, is basically a top-view of the flight plan, and may include, for example, a top-view aircraft symbol, waypoint symbols, line segments that interconnect the waypoint symbols, and range rings. The lateral map may also include various map features including, for example, weather information, terrain information, political boundaries, and navigation aids. The terrain information may include situational awareness (SA) terrain, as well as terrain cautions and warnings which, among other things, may indicate terrain that may impact the aircraft. The perspective view provides a three-dimensional view of the vehicle flight plan and may include one or more of the above-mentioned features that are displayed on the lateral map, including the terrain information.

Some modern flight deck display systems incorporate a synthetic terrain display, which generally represents a virtual or computer simulated view of terrain rendered in a conformal manner. Under certain flight conditions, all of the synthetic terrain display might be filled with rendered terrain, rendered sky, or rendered water. Under such conditions, the entire synthetic terrain display could be rendered in the same color or using a limited color palette, e.g., a bluish palette for the sky and/or water, or a brownish palette or a greenish palette for land. Consequently, it can be difficult to recognize or resolve the aircraft attitude quickly and easily when most (or all) of the synthetic terrain display is rendered using a single color palette.

BRIEF SUMMARY

A flight deck display element for an aircraft is provided. The flight deck display element is used to render a primary flight display for the aircraft. The primary flight display includes a primary display region having a perimeter, a perspective view of terrain corresponding to a flight deck viewpoint, the perspective view of terrain being rendered in the primary display region, and an attitude frame surrounding the perimeter of the primary display region. The attitude frame has a first region and a second region rendered with different visually distinguishable characteristics, and boundaries of the first region and the second region are defined by a current attitude condition of the aircraft.

A flight deck display system for an aircraft is also provided. The display system includes a processor architecture configured to receive real-time attitude data for the aircraft and, based upon the real-time attitude data, generate image rendering display commands. The system also includes a display element that receives the image rendering display commands and, in response thereto, renders a primary display region surrounded by a dynamic attitude frame. The dynamic attitude frame includes a first region and a second region rendered with different visually distinguishable characteristics. The first region and the second region are separated in accordance with a zero pitch orientation of the aircraft.

Also provided is a method for displaying information on a flight deck display element of an aircraft. The method involves the steps of receiving attitude data for the aircraft, receiving terrain data corresponding to a flight deck viewpoint, and in response to the attitude data and the terrain data, displaying a primary flight display on the flight deck display element. The primary flight display includes a perspective view of terrain corresponding to the terrain data, along with an attitude frame surrounding the perspective view of terrain. The attitude frame is divided into a first region and a second region in accordance with the attitude data, and the first region and the second region are rendered with different visually distinguishable characteristics.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
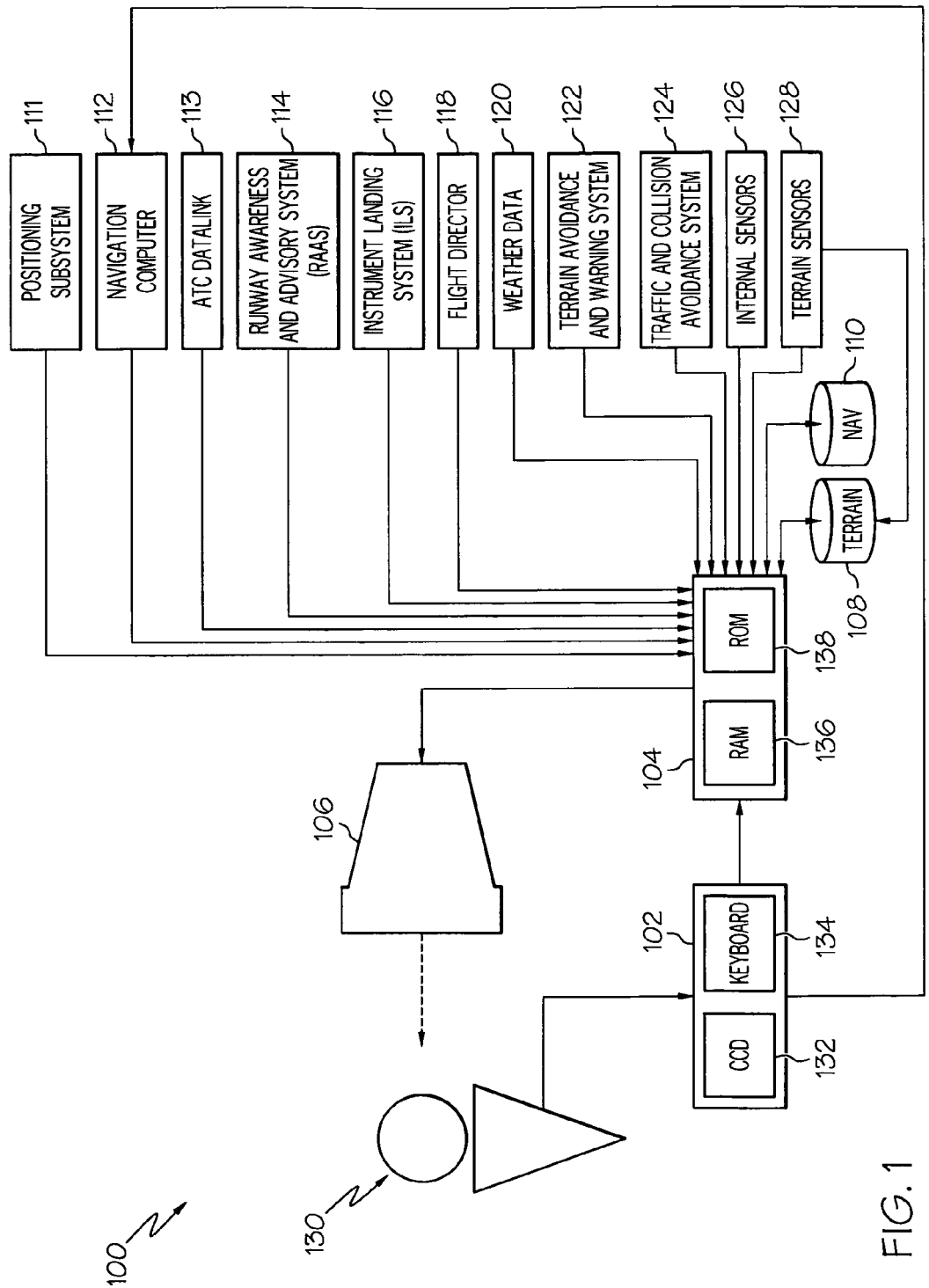
FIG. 1 is a schematic representation of an embodiment of a flight deck display system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

The subject matter described herein relates to a primary flight deck display element and related systems and operating methods. The primary flight deck display element is used to render a virtual perspective view of terrain in real-time (or substantially real-time), where the rendered terrain is conformal such that it simulates a cockpit view. The terrain fills the main or primary display region, and a dynamic attitude frame or border surrounds the primary display region. In certain embodiments the attitude frame is divided into two distinct and visibly distinguishable regions: a first area that corresponds to positive aircraft pitch, and a second area that corresponds to negative aircraft pitch. The first and second areas are rendered in a visually distinguishable manner. For example, the first area can be colored blue and the second area can be colored brown. During flight, the blue and brown areas in the attitude frame will adjust and be resized according to the current real-time attitude (i.e., pitch and roll) of the aircraft. The blue and brown frame regions make it easy for the pilot to recognize the current attitude of the aircraft in a manner that is somewhat divorced from the perspective view of terrain. Thus, even if the rendered terrain fills the primary display region with a relatively uniform appearance, the pilot can still determine the attitude of the aircraft using the color scheme of the attitude frame.

FIG. 1 depicts an exemplary flight deck display system 100 that generally includes, without limitation: a user interface 102; a processor architecture 104 coupled to user interface 102; and a display element 106 coupled to processor architecture 104. System 100 may also include, cooperate with, and/or communicate with a number of databases, sources of data, or the like. Moreover, system 100 may include, cooperate with, and/or communicate with a number of external subsystems as described in more detail below. For example, processor architecture 104 may cooperate with one or more of the following components, features, data sources, and subsystems, without limitation: one or more terrain databases 108; one or more navigation databases 110; a positioning subsystem 111; a navigation computer 112; an air traffic control (ATC) datalink 113; a runway awareness and advisory system (RAAS) 114; an instrument landing system (ILS) 116; a flight director 118; a source of weather data 120; a terrain avoidance and warning system (TAWS) 122; a traffic and collision avoidance system (TCAS) 124; one or more inertial sensors 126; and one or more terrain sensors 128.

User interface 102 is in operable communication with processor architecture 104 and is configured to receive input from a user 130 (e.g., a pilot) and, in response to the user input, supply command signals to processor architecture 104. User interface 102 may be any one, or combination, of various known user interface devices including, but not limited to, a cursor control device (CCD) 132, such as a mouse, a trackball, or joystick, one or more buttons, switches, or knobs. In the depicted embodiment, user interface 102 includes CCD 132 and a keyboard 134. The user 130 manipulates CCD 132 to, among other things, move cursor symbols that might be rendered at various times on display element 106, and the user 130 may manipulate keyboard 134 to, among other things, input textual data. As depicted in FIG. 1, user interface 102 may also be utilized to enable user interaction with navigation computer 112, the flight management system, and/or other features and components of the aircraft.

Processor architecture 104 may utilize one or more known general-purpose microprocessors or an application specific processor that operates in response to program instructions. In the depicted embodiment, processor architecture 104 includes or communicates with onboard RAM (random access memory) 136, and onboard ROM (read only memory) 138. The program instructions that control processor architecture 104 may be stored in either or both RAM 136 and ROM 138. For example, the operating system software may be stored in ROM 138, whereas various operating mode software routines and various operational parameters may be stored in RAM 136. It will be appreciated that this is merely exemplary of one scheme for storing operating system software and software routines, and that various other storage schemes may be implemented. It will also be appreciated that processor architecture 104 may be implemented using various other circuits, not just a programmable processor. For example, digital logic circuits and analog signal processing circuits could also be used.

Processor architecture 104 is in operable communication with terrain database 108, navigation database 110, and display element 106, and is coupled to receive various types of data, information, commands, signals, etc., from the various sensors, data sources, instruments, and subsystems described herein. For example, processor architecture 104 is suitably configured to obtain and process avionics-related data as needed to generate a graphical and perspective (three dimensional) representation of terrain in a primary display region, along with an attitude frame that surrounds the perimeter of the primary display region. The graphical features and characteristics of a number of exemplary primary flight displays are described below with reference to FIGS. 2-5.

In certain embodiments, processor architecture 104 is configured to respond to inertial data obtained by inertial sensors 126 to selectively retrieve terrain data from terrain database 108 or terrain sensor 128, and to selectively retrieve navigation data from navigation database 110. Processor architecture 104 can also supply appropriate display commands to display element 106, so that the retrieved terrain and navigation data are appropriately displayed on display element 106. Processor architecture 104 may be further configured to receive real-time (or virtually real-time) airspeed, altitude, attitude, waypoint, and/or geographic position data for the aircraft and, based upon that data, generate image rendering display commands associated with the display of terrain and the attitude frame. The preferred manner in which the attitude frame is displayed on display element 106 will be described in more detail further below.

Display element 106 is used to display various images and data, in both a graphical and a textual format, and to supply visual feedback to the user 130 in response to the user input commands supplied by the user 130 to user interface 102. It will be appreciated that display element 106 may be any one of numerous known displays suitable for rendering image and/or text data in a format viewable by the user 130. Non-limiting examples of such displays include various cathode ray tube (CRT) displays, and various flat panel displays such as, various types of LCD (liquid crystal display), OLED, and TFT (thin film transistor) displays. Display element 106 may additionally be based on a panel mounted display, a HUD projection, or any known technology. In an exemplary embodiment, display element 106 includes a panel display, and display element 106 is suitably configured to receive image rendering display commands from processor architecture 104 and, in response thereto, display element 106 renders a primary display region having a perimeter, a perspective view of terrain corresponding to a flight deck viewpoint, and an attitude frame or border surrounding the perimeter of the primary display region. To provide a more complete description of the operating method that is implemented by system 100, a general description of exemplary primary flight displays and various graphical features rendered thereon will provided below with reference to FIGS. 2-5.

As FIG. 1 shows, processor architecture 104 is in operable communication with the source of weather data 120, TAWS 122, and TCAS 124, and is additionally configured to generate, format, and supply appropriate display commands to display element 106 so that the avionics data, weather data 120, data from TAWS 122, data from TCAS 124, and data from the previously mentioned external systems may also be selectively rendered in graphical form on display element 106. The data from TCAS 124 can include Automatic Dependent Surveillance Broadcast (ADS-B) messages.

Terrain database 108 includes various types of data, including elevation data, representative of the terrain over which the aircraft is flying. The terrain data can be used to generate a three dimensional perspective view of terrain in a manner that appears conformal to the earth. In other words, the display emulates a realistic view of the terrain from the flight deck or cockpit perspective. The data in terrain database 108 can be pre-loaded by external data sources or provided in real-time by terrain sensor 128. Terrain sensor 128 provides real-time terrain data to processor architecture 104 and/or terrain database 108. In one embodiment, terrain data from terrain sensor 128 is used to populate all or part of terrain database 108, while in another embodiment, terrain sensor 128 provides information directly, or through components other than terrain database 108, to processor architecture 104.

In another embodiment, terrain sensor 128 can include visible, low-light TV, infrared, lidar, or radar-type sensors that collect and/or process terrain data. For example, terrain sensor 128 can be a radar sensor that transmits radar pulses and receives reflected echoes, which can be amplified to generate a radar signal. The radar signals can then be processed to generate three-dimensional orthogonal coordinate information having a horizontal coordinate, vertical coordinate, and depth or elevation coordinate. The coordinate information can be stored in terrain database 108 or processed for display on display element 106.

In one embodiment, the terrain data provided to processor architecture 104 is a combination of data from terrain database 108 and terrain sensor 128. For example, processor architecture 104 can be programmed to retrieve certain types of terrain data from terrain database 108 and other certain types of terrain data from terrain sensor 128. In one embodiment, terrain data retrieved from terrain sensor 128 can include moveable terrain, such as mobile buildings and systems. This type of terrain data is better suited for terrain sensor 128 to provide the most up-to-date data available. For example, types of information such as waterbody information and geopolitical boundaries can be provided by terrain database 108. When terrain sensor 128 detects, for example, a waterbody, the existence of such can be confirmed by terrain database 108 and rendered in a particular color such as blue by processor architecture 104.

Navigation database 110 includes various types of navigation-related data stored therein. In preferred embodiments, navigation database 110 is an onboard database that is carried by the aircraft. The navigation-related data include various flight plan related data such as, for example, and without limitation: waypoint location data for geographical waypoints; distances between waypoints; track between waypoints; data related to different airports; navigational aids; obstructions; special use airspace; political boundaries; communication frequencies; and aircraft approach information. In one embodiment, combinations of navigation-related data and terrain data can be displayed. For example, terrain data gathered by terrain sensor 128 and/or terrain database 108 can be displayed with navigation data such as waypoints, airports, etc. from navigation database 110, superimposed thereon.

Although terrain database 108 and navigation database 110 are, for clarity and convenience, shown as being stored separate from processor architecture 104, all or portions of either or both of these databases 108, 110 could be loaded into the onboard RAM 136, stored in ROM 138, or integrally formed as part of processor architecture 104. Terrain database 108 and navigation database 110 could also be part of a device or system that is physically separate from system 100.

Positioning subsystem 111 is suitably configured to obtain position data for the aircraft. In practice, positioning subsystem 111 monitors the current position of the aircraft in real-time, and the real-time position data can be used by one or more other subsystems, processing modules, or equipment on the aircraft (e.g., navigation computer 112, RAAS 114, ILS 116, flight director 118, TAWS 122, or TCAS 124). In certain embodiments, positioning subsystem 111 is realized using global positioning system (GPS) technologies that are commonly deployed in avionics applications. Thus, the position data obtained by positioning subsystem 111 may represent the latitude and longitude of the aircraft in an ongoing and continuously updated manner.

The avionics data that is supplied from inertial sensors 126 includes data representative of the state of the aircraft such as, for example, aircraft speed, altitude, attitude (i.e., pitch and roll), and heading. Inertial sensors 126 can include MEMS-based, ADHRS-related, or any other type of inertial sensor. Inertial sensors 126 may include at least one sensor that is suitably configured to obtain altitude data for the aircraft, where the altitude data represents the current real-time altitude of the aircraft. As understood by those familiar with avionics instruments, the altitude data is preferably updated in a continuous and ongoing manner.

The weather data 120 supplied to processor architecture 104 is representative of at least the location and type of various weather cells. The data supplied from TCAS 124 includes data representative of other aircraft in the vicinity, which may include, for example, speed, direction, altitude, and altitude trend. In a preferred embodiment, processor architecture 104, in response to the TCAS data, supplies appropriate display commands to display element 106 such that a graphic representation of each aircraft in the vicinity is displayed on display element 106. TAWS 122 supplies data representative of the location of terrain that may be a threat to the aircraft. Processor architecture 104, in response to the TAWS data, preferably supplies appropriate display commands to display element 106 such that the potential threat terrain is displayed in various colors depending on the level of threat. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

As was previously alluded to, one or more other external systems (or subsystems) may also provide avionics-related data to processor architecture 104 for display on display element 106. In the depicted embodiment, these external systems include a flight director 118, an instrument landing system (ILS) 116, a runway awareness and advisory system (RAAS) 114, and a navigation computer 112. Flight director 118, as is generally known, supplies command data representative of commands for piloting the aircraft in response to flight crew entered data, or various inertial and avionics data received from external systems. The command data supplied by flight director 118 may be supplied to processor architecture 104 and displayed on display element 106 for use by the user 130, or the data may be supplied to an autopilot (not illustrated). The autopilot, in turn, produces appropriate control signals that cause the aircraft to fly in accordance with the flight crew entered data, or the inertial and avionics data.

ILS 116 is a radio navigation system that provides the aircraft with horizontal and vertical guidance just before and during landing and, at certain fixed points, indicates the distance to the reference point of landing. The system includes ground-based transmitters (not shown) that transmit radio frequency signals. ILS 116 onboard the aircraft receives these signals and supplies appropriate data to the processor for display of, for example, an ILS feather (not shown in FIG. 1) on the display element 106. The ILS feather represents two signals, a localizer signal that is used to provide lateral guidance, and a glide slope signal that is used for vertical guidance.

RAAS 114 provides improved situational awareness to help lower the probability of runway incursions by providing timely aural advisories to the flight crew during taxi, takeoff, final approach, landing and rollout. RAAS 114 uses GPS data to determine aircraft position and compares aircraft position to airport location data stored in navigation database 110. Based on these comparisons, RAAS 114, if necessary, issues appropriate aural advisories. Aural advisories, which may be issued by RAAS 114, inform the user 130, among other things of when the aircraft is approaching a runway, either on the ground or from the air at times such as when the aircraft has entered and is aligned with a runway, when the runway is not long enough for the particular aircraft, the distance remaining to the end of the runway as the aircraft is landing or during a rejected takeoff, when the user 130 inadvertently begins to take off from a taxiway, and when an aircraft has been immobile on a runway for an extended time. During approach, data from sources such as GPS, including RNP and RNAV, can also be considered.

Navigation computer 112 is used, among other things, to allow the user 130 to program a flight plan from one destination to another. Navigation computer 112 may be in operable communication with flight director 118. As was mentioned above, flight director 118 may be used to automatically fly, or assist the user 130 in flying, the programmed route. Navigation computer 112 is in operable communication with various databases including, for example, terrain database 108, and navigation database 110. Processor architecture 104 may receive the programmed flight plan data from navigation computer 112 and cause the programmed flight plan, or at least portions thereof, to be displayed on display element 106.

ATC datalink 113 is utilized to provide air traffic control data to system 100, preferably in compliance with known standards and specifications. Using ATC datalink, processor architecture 104 can receive air traffic control data from ground based air traffic controller stations and equipment. In turn, system 100 can utilize such air traffic control data as needed.

In operation, a flight deck display system as described herein is suitably configured to process current status data for the host aircraft and generate a primary flight display having graphical features and characteristics that are influenced by the current status data. The current status data for a given aircraft may include, without limitation: flight plan data; geographic position data; altitude data; attitude (roll and pitch) data; or the like. In response to the current status data, the display system can generate and display an appropriately formatted image on its display element.

In this regard, FIGS. 2-5 are graphical representations of a primary flight display 200 corresponding to different flight conditions. Primary flight display 200 includes graphical representations and images of a number of display elements. The state of primary flight display 200 depicted in FIG. 2 corresponds to a grounded aircraft. This embodiment of primary flight display 200 generally includes, without limitation: a primary display region 202; a perspective view of terrain 204 rendered in primary display region 202; and an attitude frame 206 surrounding the perspective view of terrain 204.

Primary display region 202 can be shaped, sized, and/or oriented as needed to suit the desired application or the preferences of the user. This particular embodiment utilizes a generally rectangular primary display region 202 having a perimeter 208 that defines its outermost boundary. Most of the graphical information for primary flight display 200 is rendered within perimeter 208. For example, the perspective view of terrain 204, which roughly corresponds to a flight deck viewpoint, is rendered in primary display region 202 such that the outermost boundary of terrain 204 is defined by perimeter 208. As explained previously, the perspective view of terrain 204 can be continuously updated in substantially real-time such that it emulates the pilot's cockpit view in a manner that is conformal to the actual surrounding environment.

Figure 2:
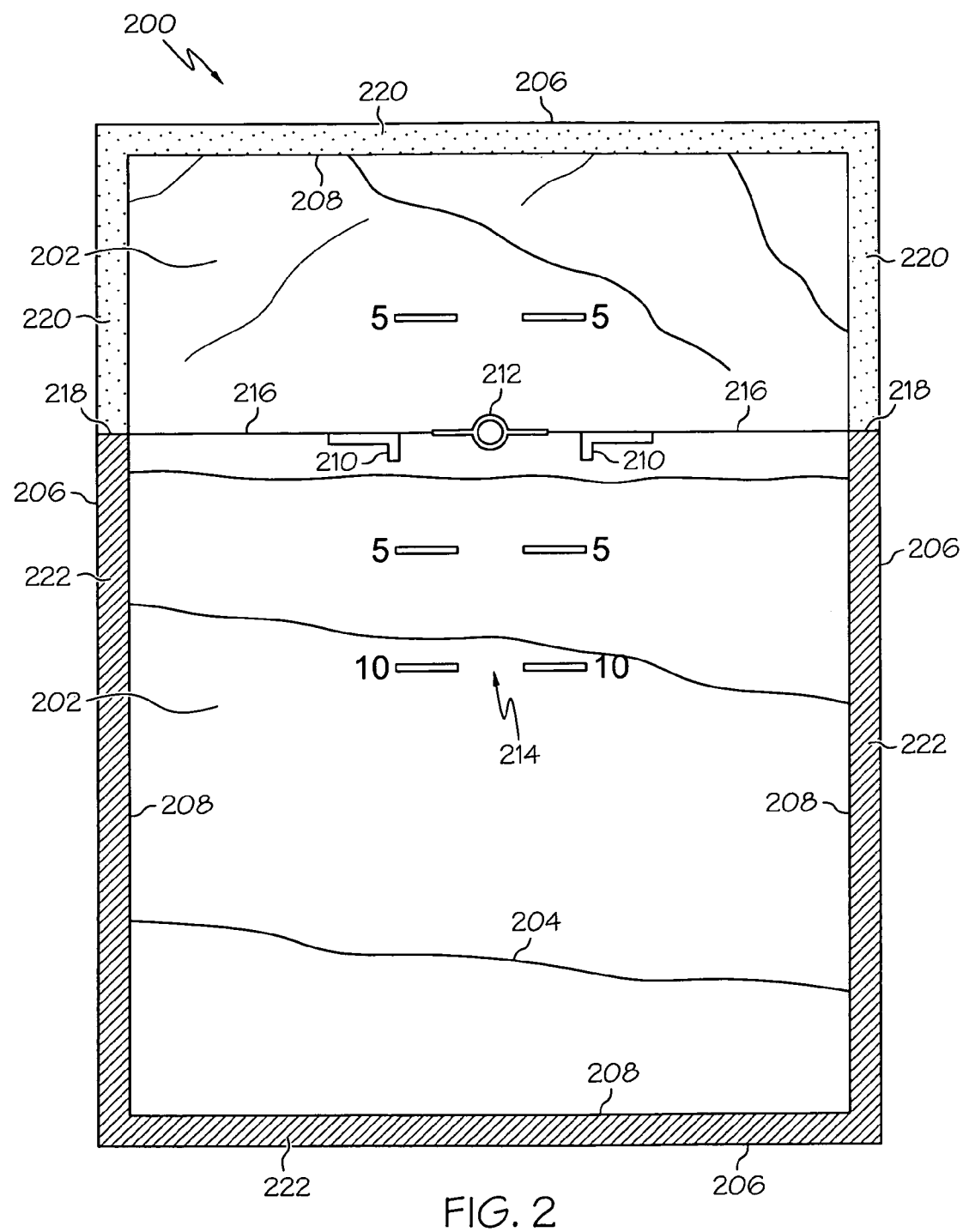
FIGS. 2-5 are graphical representations of primary flight displays having respective attitude frames.

Primary display region 202 may also include a number of additional elements, graphical features, and/or information as desired for the deployment. For example, FIG. 2 depicts an aircraft reference symbol 210, a flight path symbol 212, a pitch ladder scale 214, and a zero pitch reference line 216. The embodiment shown in FIG. 2 has been simplified for ease of description and clarity of illustration—in practice, primary display region 202 may also contain graphical elements corresponding to or representing: an airspeed tape; an altimeter tape; a compass or horizontal situation indicator; waypoint markers; flight plan indicia; flight data; numerical information; pilot guidance elements; trend data; and the like.

Aircraft reference symbol 210, which includes two wing-shaped elements in this embodiment, represents the aircraft position as a reference for other graphical features of primary flight display 200. In certain embodiments, aircraft reference symbol 210 is rendered in a noticeable color (such as yellow), pattern, and/or brightness. Aircraft reference symbol 210 is rendered in a fixed position in primary display region 202. In other words, one can imagine that aircraft reference symbol 210 is "etched into the glass" used for primary flight display 200.

For this example, flight path symbol 212 is rendered as a circle with horizontal marks extending from the circle. In certain embodiments, flight path symbol 212 is rendered in a noticeable color (such as bright green), pattern, and/or brightness. Flight path symbol 212 represents the current flight path of the aircraft. During flight, the flight path symbol 212 moves within primary display region 202 such that it generally indicates the direction the aircraft is currently moving. For example, if the aircraft is descending, then flight path symbol 212 will appear below zero pitch reference line 216. Conversely, if the aircraft is climbing, then flight path symbol 212 will appear above zero pitch reference line 216. FIG. 2 depicts primary flight display 200 when the aircraft is on the ground. Accordingly, flight path symbol 212 is centered within primary display region 202, and it is aligned with zero pitch reference line 216.

Pitch ladder scale 214 includes a number of parallel marks and/or alphanumeric characters that indicate the pitch of the aircraft using any convenient scale. In certain embodiments, pitch ladder scale 214 is rendered in a white color. Notably, zero pitch on pitch ladder scale 214 corresponds to zero pitch reference line 216. In other words, zero pitch reference line 216 may be considered to be an extension of pitch ladder scale 214. Markings of pitch ladder scale 214 that appear above zero pitch reference line 216 correspond to positive pitch of the aircraft, and markings of pitch ladder scale 214 that appear below zero pitch reference line 216 correspond to negative pitch of the aircraft. The "intersection" of aircraft reference symbol 210 with pitch ladder scale 214 represents the current pitch of the aircraft, as indicated on pitch ladder scale 214. Thus, for the grounded condition depicted in FIG. 2, the aircraft is at zero pitch and zero pitch reference line 216 is aligned with aircraft reference symbol 210.

During normal operation and for normal flight conditions, zero pitch reference line 216 is rendered in a conformal manner such that it moves (up and down) and rotates (clockwise and counterclockwise) within primary display region 202 in accordance with the current aircraft flight status. In this regard, the rendering and display of zero pitch reference line 216 is influenced by the actual zero pitch orientation of the aircraft. Moreover, pitch ladder scale 214 is dynamically rendered within primary display region 202, and its scale markings and pitch measurement numbers may appear and disappear as needed to accommodate the positioning of pitch ladder scale 214 within primary display region 202. As explained in more detail below, under some flight conditions zero pitch reference line 216 may become non-conformal. However, even under such flight conditions, pitch ladder scale 214 can still scroll within primary display region 202 in the usual manner.

Figure 3:
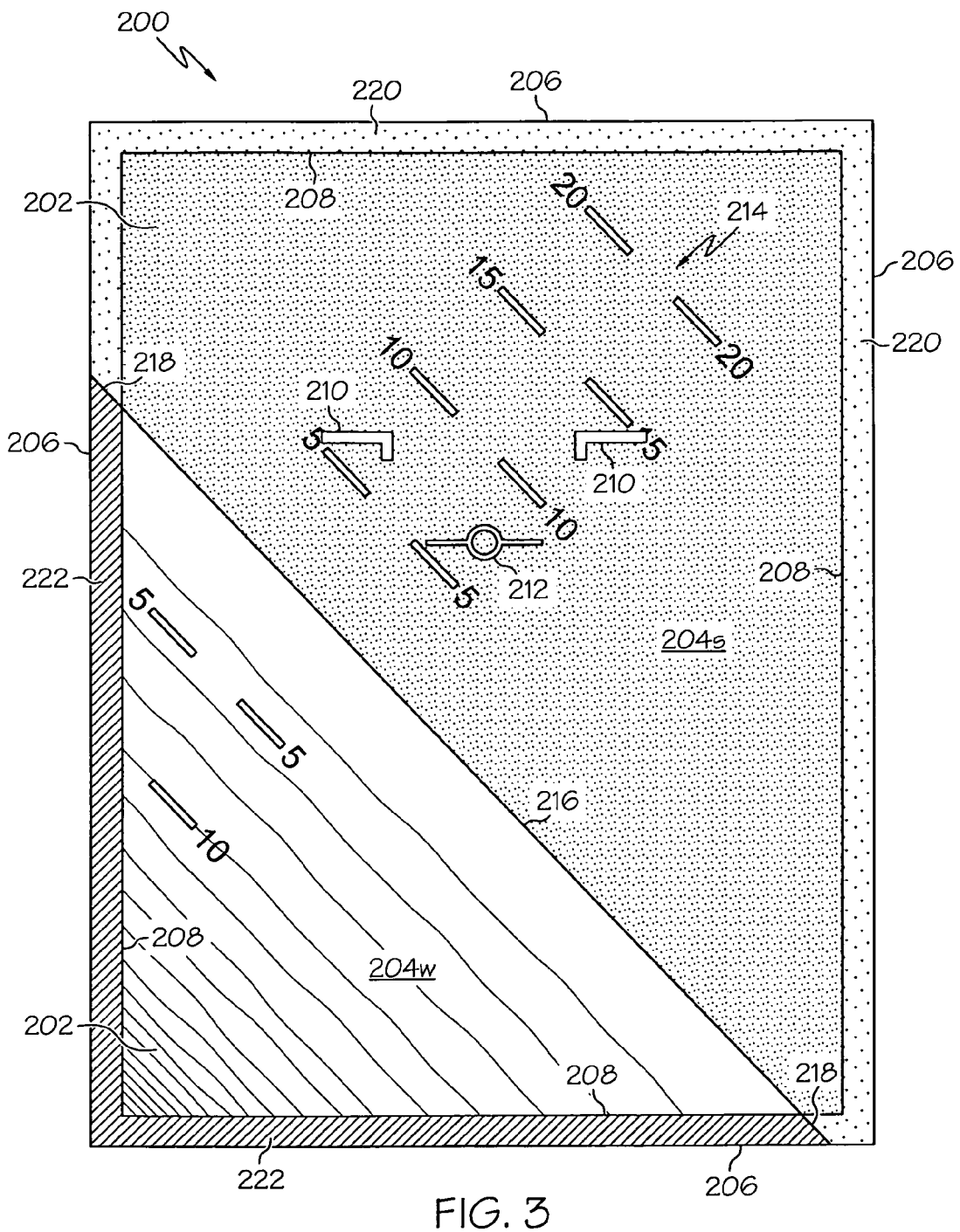
Figure 4:
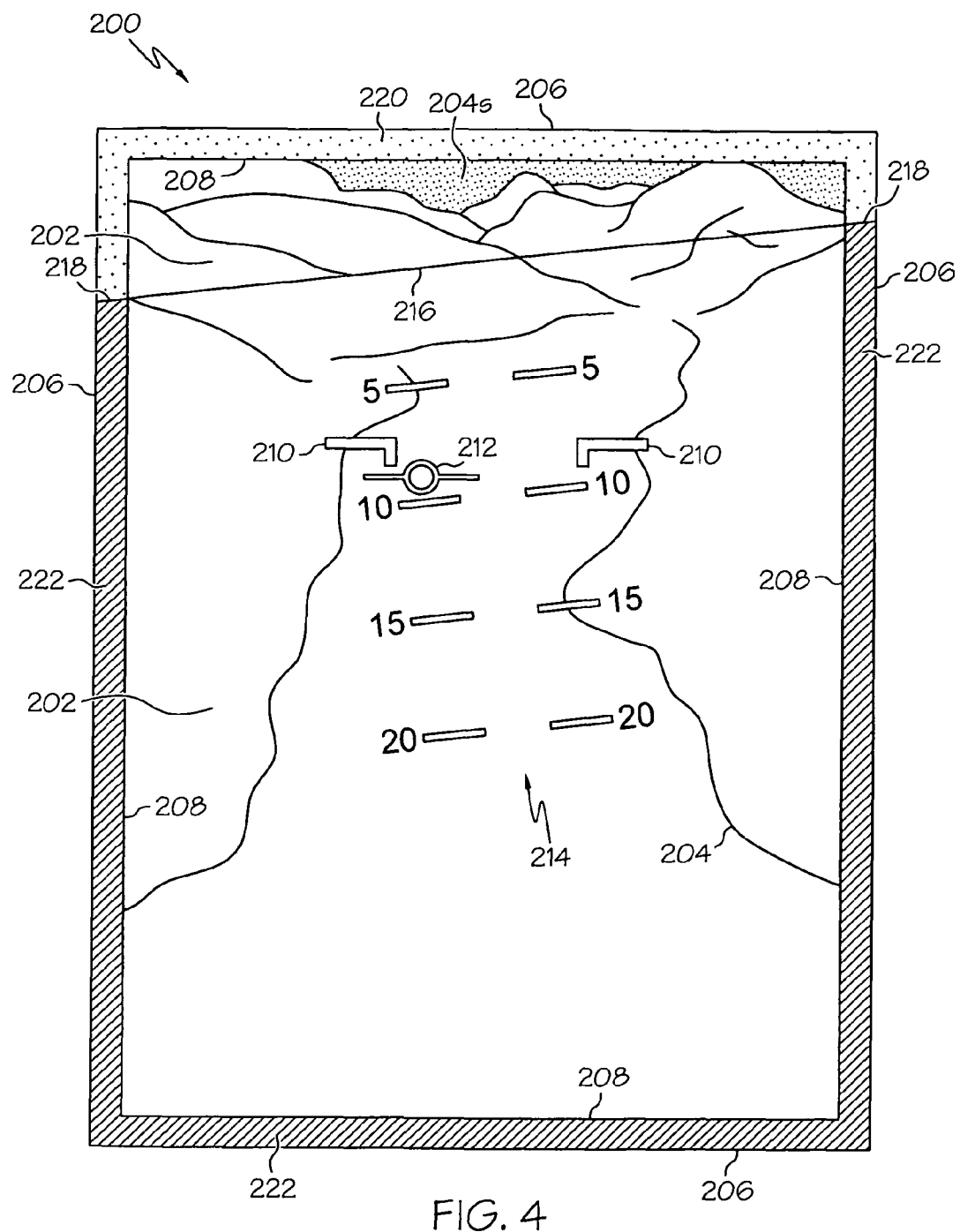
Figure 5:
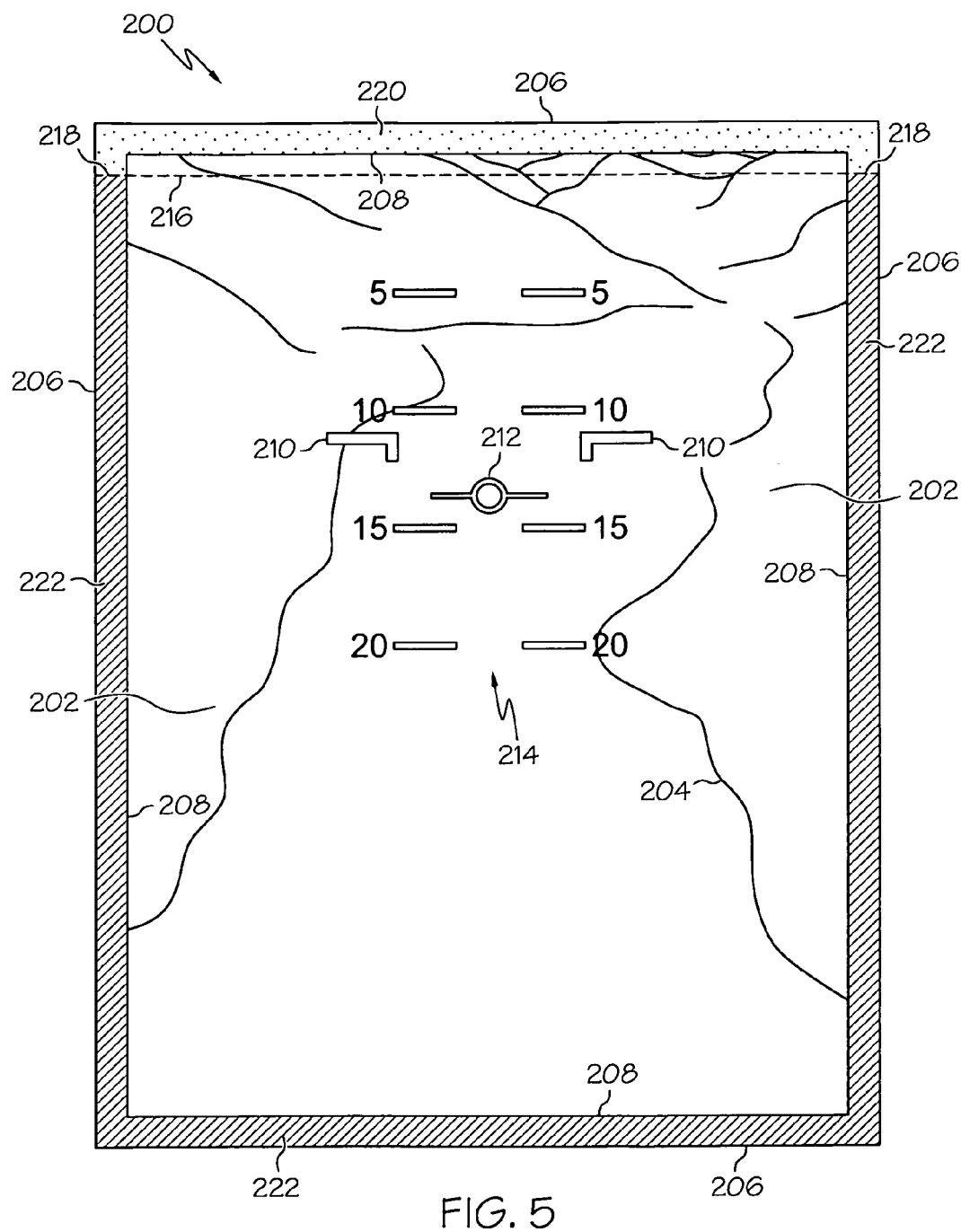

In preferred embodiments, zero pitch reference line 216 is rendered using different visually distinctive or distinguishable characteristics depending on whether or not it is conformal. In other words, zero pitch reference line 216 is rendered with first visually distinctive/distinguishable characteristics when it is conformal to the perspective view of terrain 204 (as depicted in FIGS. 2-4), and with second visually distinctive/distinguishable characteristics when it is non-conformal to the perspective view of terrain 204 (as depicted in FIG. 5). The visually distinguishable or distinctive characteristics can be specified such that the user can quickly and easily interpret the display to determine whether zero pitch reference line 216 is conformal or non-conformal. As used herein, "visually distinguishable characteristics" or "visually distinctive characteristics" may correspond to any of the following characteristics, individually or in any combination thereof: different colors; different brightness; different transparency levels; different translucency levels; different patterns; different shapes; different sizes; different flicker patterns; different focus levels; different sharpness levels; different orientations; different alignments; and different clarity levels. In the exemplary embodiments shown here, zero pitch reference line 216 is rendered as a solid line when it is conformal, and as a dashed line when it is non-conformal.

In preferred embodiments, the current position of zero pitch reference line 216 influences the manner in which attitude frame 206 is rendered. More specifically, zero pitch reference line 216 defines a boundary 218 between a first region 220 and a second region 222 of attitude frame 206. Accordingly, zero pitch reference line 216 indicates separation of first region 220 from second region 222. In preferred embodiments, first region 220 and second region 222 share at least one boundary (e.g., boundary 218). In alternate embodiments, however, first region 220 and second region 222 could be separated by a gap and/or by some other rendered feature. Moreover, although not always required, zero pitch reference line 216 may extend into attitude frame 206 as shown in FIGS. 2-5.

Notably, first region 220 corresponds to the area of attitude frame 206 that is "above" zero pitch reference line 216, i.e., first region 220 corresponds to positive pitch of the aircraft. Conversely, second region 222 corresponds to the area of attitude frame 206 that is "below" zero pitch reference line 216, i.e., second region 222 corresponds to negative pitch of the aircraft. In this context, the terms "above" and "below" are relative to the zero pitch reference of pitch ladder scale 214.

As mentioned previously, attitude frame 206 surrounds perimeter 208 of primary display region 202. In practice, attitude frame 206 may be rendered with inner and outer border lines that contrast with the perspective view of terrain 204 and/or that contrast with any area of the display that appears outside of attitude frame 206. For example, the borders of attitude frame 206 itself may be rendered in black or white such that the colors used for first region 220 and second region 222 do not bleed or blend into the colors used for the perspective view of terrain 204. Moreover, the boundaries of first region 220 and second region 222 are defined by the current attitude condition of the aircraft, making attitude frame 206 dynamic in nature. In practice, the real-time position and orientation of boundary 218 will be influenced by the real-time attitude data of the aircraft (pitch data and roll data). For the grounded condition depicted in FIG. 2 (zero pitch and zero roll), boundary 218 is aligned with aircraft reference symbol 210, and boundary 218 is horizontal relative to the overall orientation of primary flight display 200.

Notably, first region 220 and second region 222 are rendered with different visually distinguishable characteristics that enable the pilot (or other crew member) to quickly and easily determine the current attitude status of the aircraft during flight. In preferred embodiments, the different visually distinguishable characteristics include different colors—for example, blue for first region 220 and brown for second region 222. The color scheme can be chosen so that the division of attitude frame 206 into first region 220 and second region 222 is easy to detect, obvious, and noticeable. Moreover, the colors for first region 220 and second region 222 can be chosen to convey additional contextual meaning. For example, first region 220 may be displayed in a first color (e.g., blue) that is indicative of positive pitch conditions or the sky, and second region 222 may be displayed in a second color (e.g., brown) that is indicative of negative pitch conditions or terra firma. Indeed, the color scheme can be selected in accordance with familiar or standardized aviation instrumentation.

The use of attitude frame 206 is desirable to enhance situational awareness of the aircraft, especially when the perspective view of terrain 204 is rendered in primary display region 202. FIG. 2 depicts one scenario where attitude frame 206 clearly indicates the demarcation between positive and negative pitch using the visually distinguishable first region 220 and second region 222, even though the perspective view of terrain 204 might predominantly include brown or green colored terrain (and no rendered blue sky), which could lead to some confusion. FIG. 3 depicts another scenario where the perspective view of terrain 204 includes a blend of sky and water, both of which are rendered using a predominantly blue color scheme. Consequently, even though a horizon between the rendered sky terrain 204s and the rendered water terrain 204w is displayed, it may be difficult to quickly discern the horizon due to the predominantly blue color scheme used throughout primary display region 202. Nonetheless, attitude frame 206 is still rendered such that first region 220 and second region 222 are visually distinguishable. Incidentally, FIG. 3 depicts the following flight conditions: positive pitch of approximately seven degrees; banking/rolling to the left at about forty-five degrees; and a climbing flight path of approximately five degrees (flight path symbol 212 is displayed as a positive value relative to pitch ladder scale 214).

FIG. 4 depicts the real-time status of primary flight display 200 under the following flight conditions: negative pitch of approximately eight degrees; banking/rolling to the right at about twelve degrees; and a descending flight path. Notably, even though the perspective view of terrain 204 includes a small amount of rendered sky terrain 204s (near the top of primary display region 202), the sliver of sky terrain 204s by itself may be difficult to detect during flight because virtually all of primary display region 202 is being used to render brown/green terrain. Again, attitude frame 206 will be rendered such that first region 220 and second region 222 can be easily detected for purposes of attitude awareness.

FIG. 5 depicts primary flight display 200 at a time when zero pitch reference line 216 is non-conformal to the perspective view of terrain 204. At this time, the actual pitch of the aircraft is a relatively high negative value indicating a rapid descent. The actual negative pitch measurement, however, would cause a conformal zero pitch reference line to migrate beyond the boundary of primary display region 202. Preferred embodiments of the flight deck display system handle this situation by converting zero pitch reference line 216 into a non-conformal element. When in a non-conformal state, zero pitch reference line 216 is rendered in a distinctive manner (e.g., in a dashed line pattern as shown in FIG. 5) relative to how it is rendered when in a conformal state. When non-conformal, zero pitch reference line 216 no longer tracks the actual zero pitch orientation of the aircraft. Nonetheless, pitch ladder scale 214 preferably continues to scroll in a real-time and accurate manner, which allows the viewer to determine the actual pitch of the aircraft. Moreover, even though zero pitch reference line 216 might be rendered in a non-conformal manner, the system may still allow it to rotate clockwise or counterclockwise in accordance with the real-time roll status of the aircraft.

When non-conformal, zero pitch reference line 216 still serves as a dividing line between first region 220 and second region 222. Accordingly, in preferred embodiments attitude frame 206 will always include at least some portion corresponding to first region 220 and at least some portion corresponding to second region 222 (in other words, attitude frame 206 will always be rendered with at least two regions having contrasting visual characteristics). Therefore, primary flight display 200 can still convey the general attitude orientation and provide an easy visually distinguishable attitude reference to the viewer. For this particular embodiment, relatively high positive pitch values cause zero pitch reference line 216 to be "pinned" in a non-conformal manner near the bottom of primary display region 202, and relatively high negative pitch values cause zero pitch reference line 216 to be "pinned" in a non-conformal manner near the top of primary display region 202.

Figure 6:
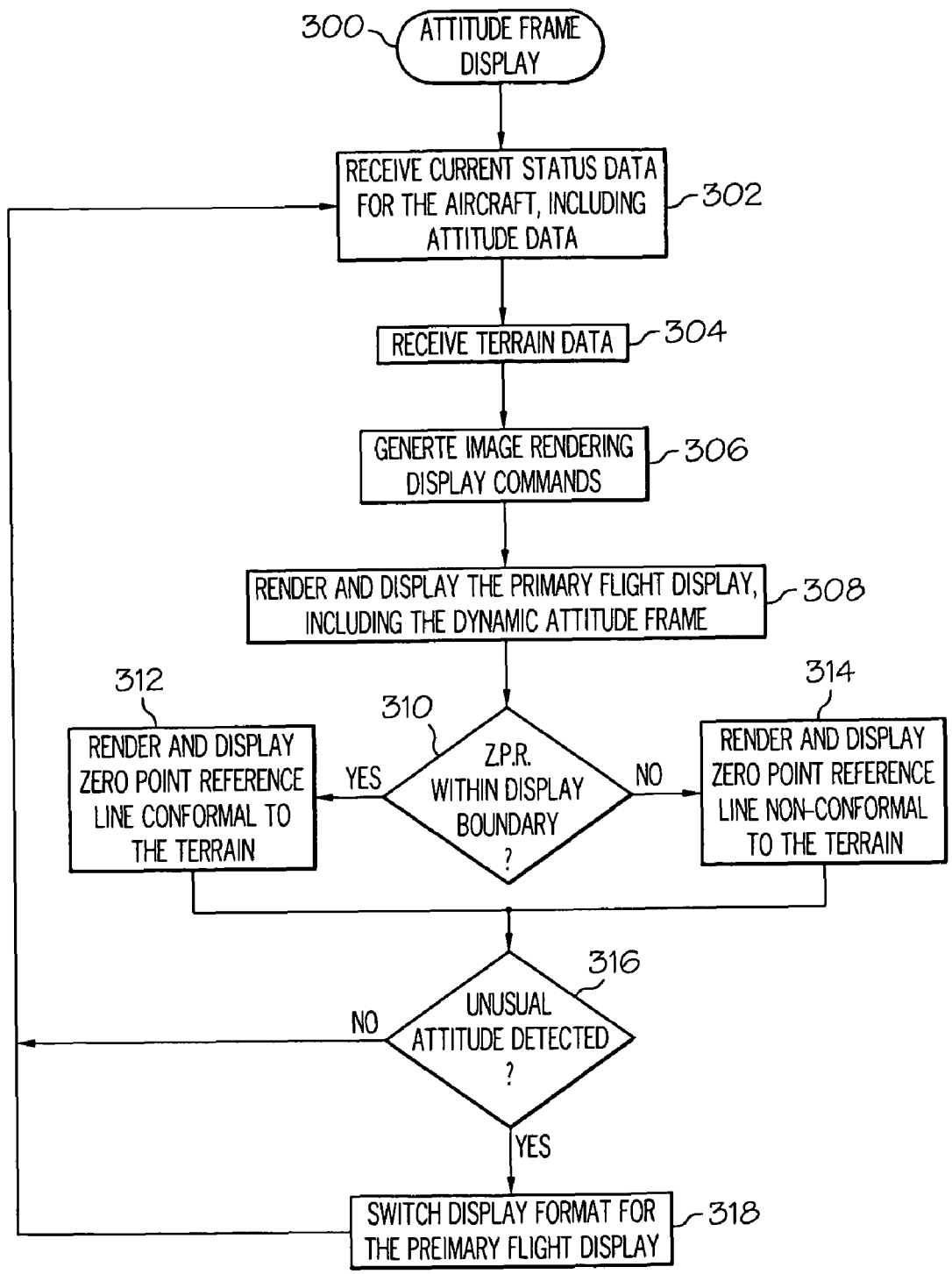
FIG. 6 is a flow chart that illustrates an exemplary embodiment of an attitude frame display process.

FIG. 6 is a flow chart that illustrates an exemplary embodiment of an attitude frame display process 300, which may be performed by a flight deck display system of the type described above. For the sake of brevity, conventional techniques related to the collection and processing of avionics data, the generation and rendering of graphics, computer graphics engines, and other functional aspects of the systems (and the individual operating components of the systems) may not be described in detail herein. The various tasks performed in connection with process 300 may be performed by software, hardware, firmware, or any combination thereof. For illustrative purposes, the following description of process 300 may refer to elements mentioned above in connection with FIGS. 1-5. In practice, portions of process 300 may be performed by different elements of the described system, e.g., a processor, a graphics engine, a display element, or a sensor. It should be appreciated that process 300 may include any number of additional or alternative tasks, the tasks shown in FIG. 6 need not be performed in the illustrated order, and process 300 may be incorporated into a more comprehensive procedure or process having additional functionality not described in detail herein.

In practice, process 300 can be performed in a virtually continuous manner at a relatively high refresh rate. For example, an iteration of process 300 could be performed at a rate of 12-40 Hz (or higher) such that the primary flight display will be updated in real-time or substantially real time in a dynamic manner. This particular embodiment of process 300 begins by receiving the current status data for the host aircraft (task 302). This current status data may include, among other items, the attitude data (e.g., real-time pitch data and real-time roll data) for the aircraft. Process 300 also receives, obtains, or accesses terrain data corresponding to a flight deck viewpoint (task 304). As mentioned above, this terrain data represents the current image of the terrain as perceived from the cockpit view.

The current status data for the aircraft is then processed in an appropriate manner to generate applicable image rendering display commands that correspond to the primary flight display for the aircraft (task 306). The image rendering display commands are based upon or otherwise influenced by the current status data—the graphical display characteristics of the primary flight display are dependent upon the current status data, including the terrain data and the attitude data of the aircraft. The image rendering display commands are then used to control the rendering of the primary flight display on a display element (task 308). As explained above, the primary flight display preferably includes a dynamic attitude frame having visually distinguishable regions that provide enhanced attitude awareness.

If process 300 detects that the zero pitch reference can be rendered within the boundary of the primary display region (query task 310), then the flight deck display system will render and display the zero pitch reference line in a manner that is conformal to the perspective view of terrain (task 312).

FIGS. 2-4 depict the zero pitch reference line 216 rendered in a conformal manner. If query task 310 determines that the zero pitch reference is outside the boundary of the primary display region, then the system will instead render and display the zero pitch reference line in a manner that is non-conformal to the perspective view of terrain (task 314). FIG. 5 depicts the zero pitch reference line 216 rendered in a non-conformal manner.

Certain embodiments of attitude frame display process 300 may be suitably designed to detect and respond to unusual or abnormal attitude conditions. As used herein, "unusual attitude" means that the aircraft is currently flying with an attitude that is not normally experienced during regular flight patterns and flight plans. For example, the system may define an unusual attitude to be any attitude where the aircraft is banking at a relatively severe angle (e.g., greater than sixty degrees) and where the pitch is above a defined threshold (e.g., positive forth degrees or negative twenty degrees). If an unusual attitude is not detected (query task 316), then process 300 exits or returns to task 302 to resume processing and refresh the current status data. Conversely, if an unusual attitude is detected, then process 300 can switch the display format and characteristics for the primary flight display in an appropriate manner (task 318) to provide a warning or additional attitude awareness. For example, in response to the detection of an unusual attitude, the perspective view of terrain may be replaced with two differently colored sections (e.g., blue and brown) that are divided by the zero pitch reference line. The display of relatively large colored sections in this manner will enable the pilot to immediately determine the attitude condition of the aircraft and will assist the pilot during corrective flight maneuvers.

Following task 318, process 300 exits or returns to task 302 to resume processing and refresh the current status data. In this manner, process 300 can be repeated indefinitely and at any practical rate to support continuous and dynamic updating and refreshing of the primary flight display and, in particular, the attitude frame surrounding the perspective view of terrain. Frequent updating of the primary flight display enables the flight crew to obtain and respond to the current attitude situation in virtually real-time.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A flight deck display element for an aircraft, the flight deck display element having rendered thereon a primary flight display comprising:
   a primary display region having a perimeter;
   a perspective view of terrain corresponding to a flight deck viewpoint, the perspective view of terrain being rendered in the primary display region; and
   an attitude frame surrounding the perimeter of the primary display region, the attitude frame comprising a first region and a second region rendered with different visually distinguishable characteristics, wherein boundaries of the first region and the second region are defined by a current attitude condition of the aircraft.

2. The flight deck display element of claim 1, wherein the first region and the second region share at least one boundary.

3. The flight deck display element of claim 1, wherein the primary flight display further comprises a zero pitch reference line rendered thereon, the zero pitch reference line defining a boundary between the first region and the second region.

4. The flight deck display element of claim 3, wherein the first region corresponds to area of the attitude frame above the zero pitch reference line, and the second region corresponds to area of the attitude frame below the zero pitch reference line.

5. The flight deck display element of claim 4, wherein the first region is rendered in a first color, and the second region is rendered in a second color.

6. The flight deck display element of claim 5, wherein the first color is blue and the second color is brown.

7. The flight deck display element of claim 3, wherein the zero pitch reference line is rendered with first visually distinctive characteristics when conformal to the perspective view of terrain, and with second visually distinctive characteristics when non-conformal to the perspective view of terrain.

8. The flight deck display element of claim 1, wherein the different visually distinguishable characteristics are selected from the group consisting of: different colors; different brightness; different transparency levels; different translucency levels; different patterns; different shapes; different sizes; different flicker patterns; different focus levels; different sharpness levels; different orientations; different alignments; and different clarity levels.

9. A flight deck display system for an aircraft, the system comprising:
   a processor architecture configured to receive real-time attitude data for the aircraft and, based upon the real-time attitude data, generate image rendering display commands; and
   a display element that receives the image rendering display commands and, in response thereto, renders a primary display region surrounded by a dynamic attitude frame that comprises a first region and a second region rendered with different visually distinguishable characteristics, wherein the first region and the second region are separated in accordance with a zero pitch orientation of the aircraft.

10. The flight deck display system of claim 9, wherein the real-time attitude data comprises pitch data for the aircraft.

11. The flight deck display system of claim 9, wherein the real-time attitude data comprises roll data for the aircraft.

12. The flight deck display system of claim 9, wherein the display element renders a zero pitch reference line in the primary display region, the zero pitch reference line being influenced by the zero pitch orientation of the aircraft.

13. The flight deck display system of claim 12, wherein a boundary between the first region and the second region is defined by the zero pitch reference line.

14. The flight deck display system of claim 9, wherein the display element renders a perspective view of terrain in the primary display region, the perspective view of terrain corresponding to a flight deck viewpoint.

15. The flight deck display system of claim 9, wherein the display element renders the first region in a first color, and renders the second region in a second color.

16. A method for displaying information on a flight deck display element of an aircraft, the method comprising:
   receiving attitude data for the aircraft;

receiving terrain data corresponding to a flight deck viewpoint; and in response to the attitude data and the terrain data, displaying a primary flight display on the flight deck display element, the primary flight display comprising a perspective view of terrain corresponding to the terrain data, and comprising an attitude frame surrounding the perspective view of terrain, the attitude frame divided into a first region and a second region in accordance with the attitude data, and the first region and the second region being rendered with different visually distinguishable characteristics.

17. The method of claim 16, wherein receiving attitude data comprises:
receiving real-time pitch data for the aircraft; and
receiving real-time roll data for the aircraft.

18. The method of claim 16, further comprising displaying, in response to the attitude data, a zero pitch reference line that indicates separation of the first region and the second region.

19. The method of claim 18, wherein the zero pitch reference line is displayed in a manner that is conformal relative to the perspective view of terrain.

20. The method of claim 18, wherein:
the first region corresponds to positive pitch of the aircraft;
the second region corresponds to negative pitch of the aircraft;
the first region is displayed in a first color that is indicative of positive pitch; and
the second region is displayed in a second color that is indicative of negative pitch.

* * * * *